No. 790,704. PATENTED MAY 23, 1905.
F. S. OSBORNE.
GRAIN SEPARATOR.
APPLICATION FILED JULY 1, 1904.
4 SHEETS—SHEET 1.
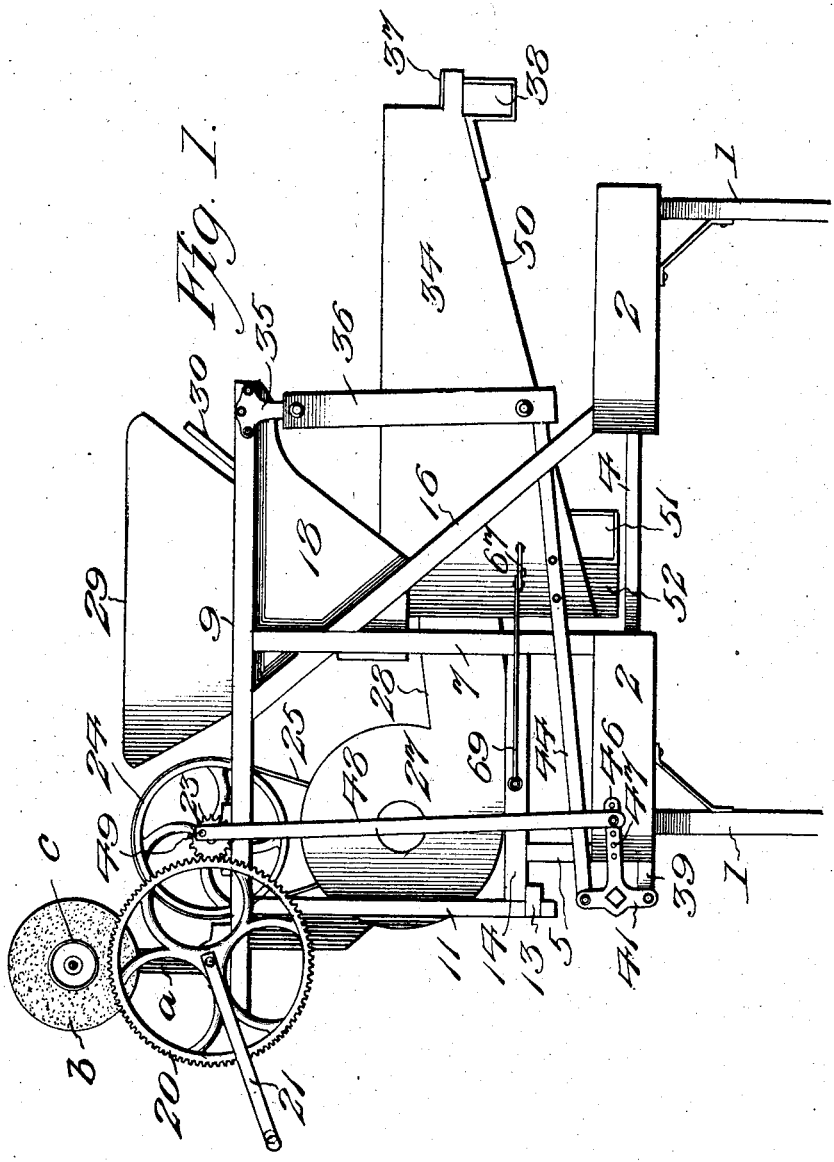
Witnesses
Wm. J. Koorth
A. G. Huysman
Inventor
F. S. Osborne,
By Victor J. Evans
Attorney

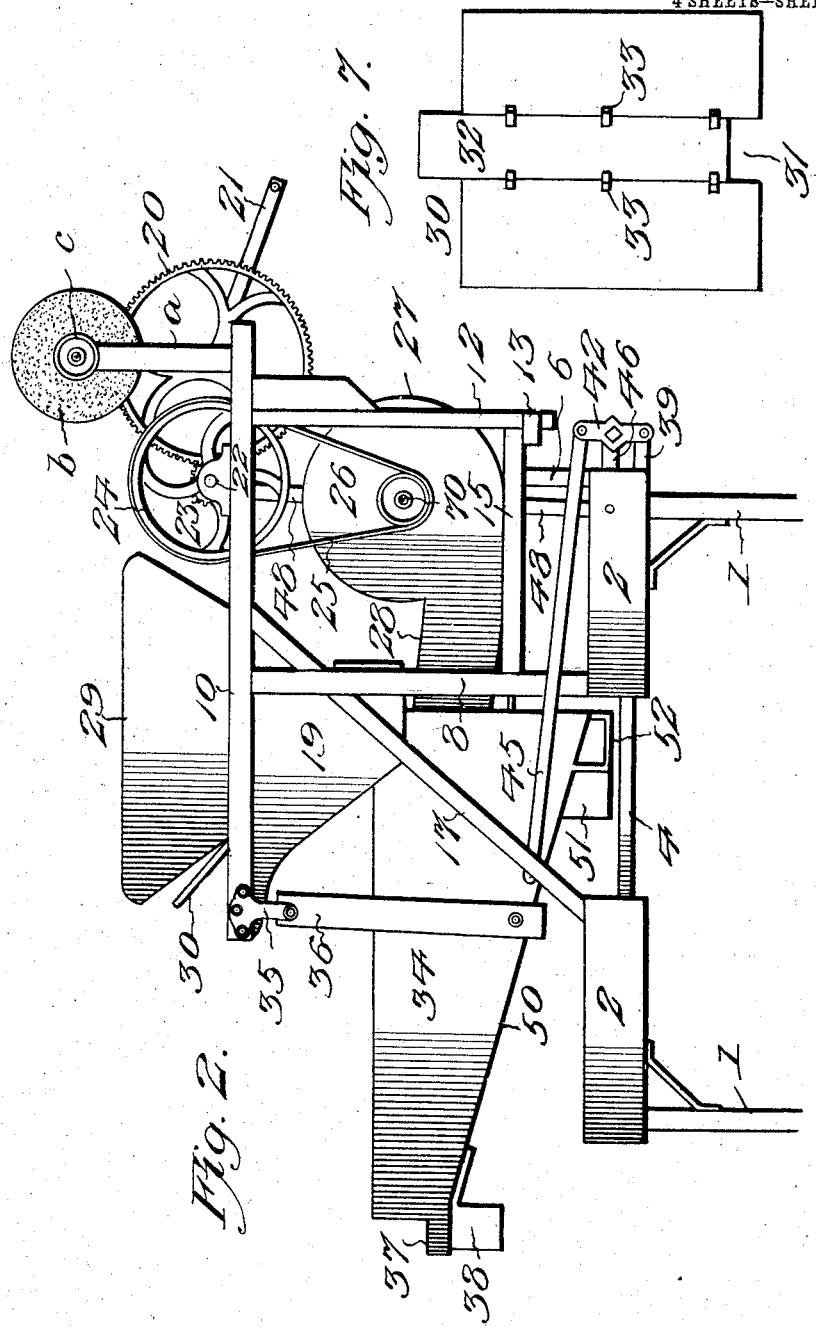

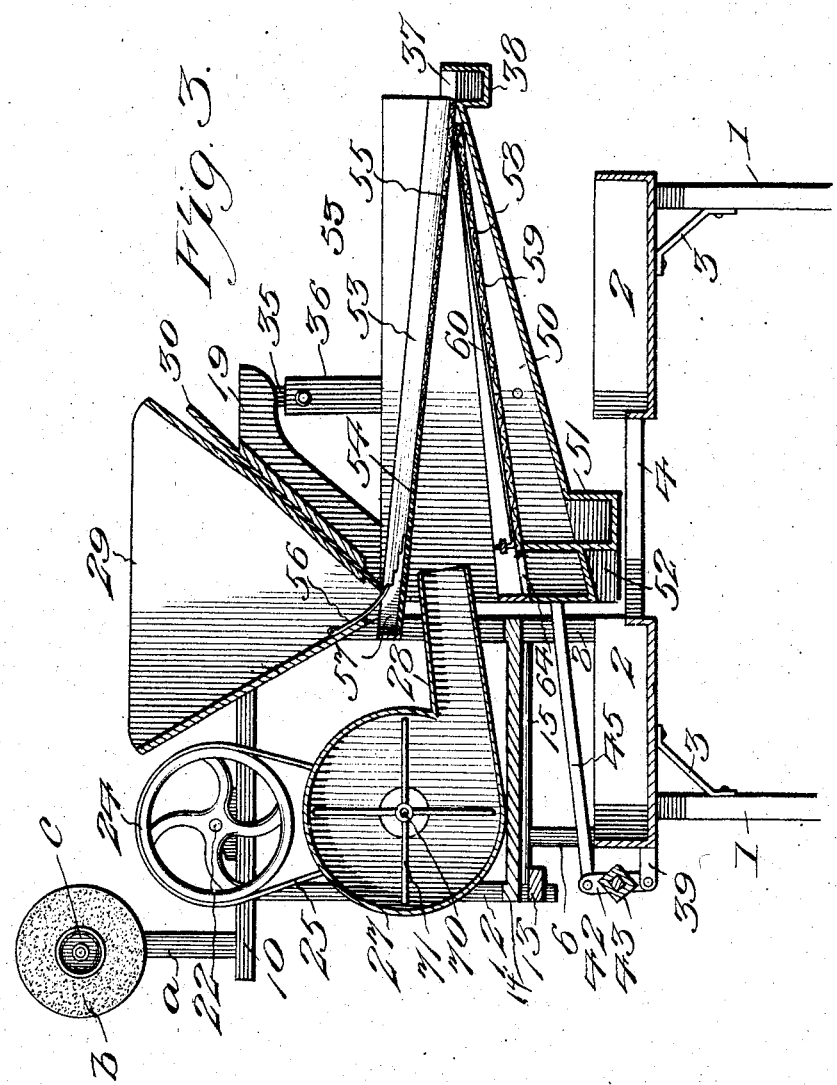

No. 790,704. PATENTED MAY 23, 1905.
F. S. OSBORNE.
GRAIN SEPARATOR.
APPLICATION FILED JULY 1, 1904.
4 SHEETS—SHEET 4.
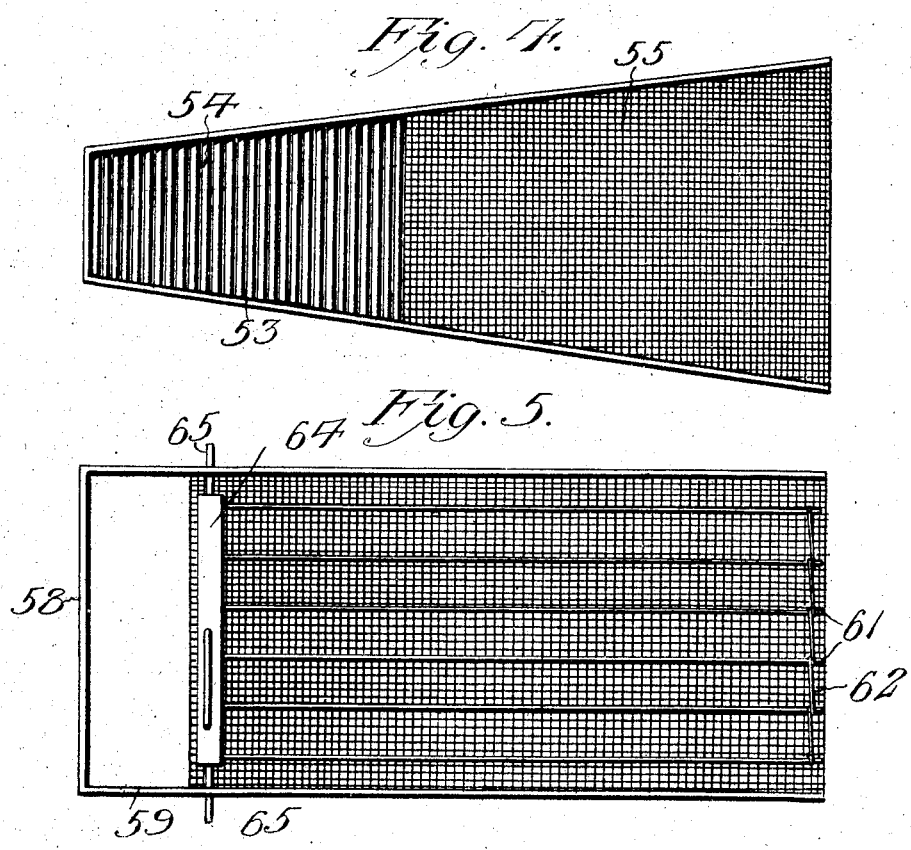
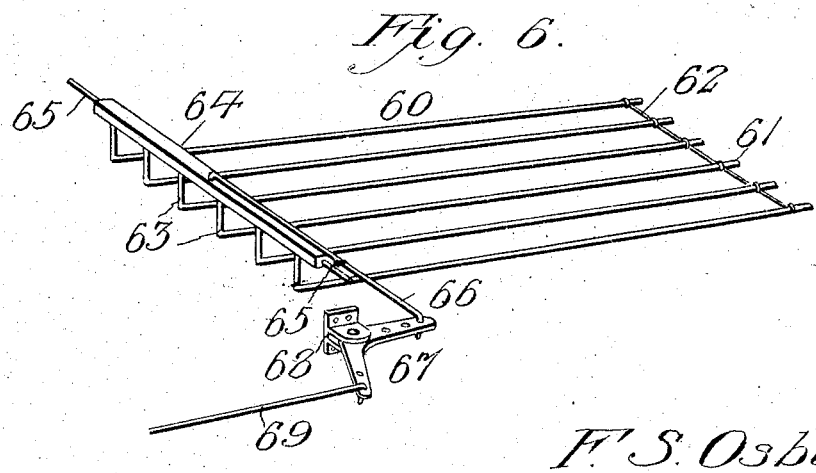
Witnesses
W. M. Roerth
A. G. Heylmun
Inventor
F. S. Osborne,
By Victor J. Evans
Attorney No. 790,704.

Patented May 23, 1905.

UNITED STATES PATENT OFFICE.

FRANK S. OSBORNE, OF SHINGLEHOUSE, PENNSYLVANIA.

GRAIN-SEPARATOR.

SPECIFICATION forming part of Letters Patent No. 790,704, dated May 23, 1905.

Application filed July 1, 1904. Serial No. 214,952.

*To all whom it may concern:*

Be it known that I, FRANK SHELDON OSBORNE, a citizen of the United States, residing at Shinglehouse, in the county of Potter and State of Pennsylvania, have invented new and useful Improvements in Grain-Separators, of which the following is a specification.

My invention relates to improvements in grain-separators of that kind using shaking-screens and blowers to effect the cleaning; and the object is to simplify and improve the existing machines in the art by providing a machine which is simply constructed, efficient in the purposes for which made, and durable in use.

The invention embodies a suitable casing or housing, screens of particular make, a fan or blower, and means to shake the several screens to separate the chaff or glumes from the grain.

The invention also consists in the novel construction of parts and their aggroupment in operative combinations, as will be hereinafter fully specified and the alleged novelty then particularly pointed out and definitely claimed.

The invention also consists in combining with the mechanism of the separating members a grinding-wheel, as will be specified.

I have fully and clearly illustrated the improvements in the annexed drawings, to be taken as a part of this specification, and wherein—

Figure 1 is a side view in elevation of the complete machine. Fig. 2 is a view in side elevation of the complete machine, taken from the opposite or reverse side to Fig. 1. Fig. 3 is a vertical central longitudinal section through the machine, showing the various members and parts in operative assemblage. Fig. 4 is a top plan view of the upper screen used in the machine, showing the flaring shape given to it. Fig. 5 is a top plan view of the lower screen and the agitator-bars arranged thereon. Fig. 6 is a detail perspective view of the agitator-bars and the lever for agitating them transversely to their length. Fig. 7 is a plan view of the regulator-slide to the hopper and the central slide located therein.

In the drawings the same reference-notations appearing in different figures denote the same parts.

Referring to the drawings, it will be seen that the operating members are supported and held on and by a suitable frame, which is composed of supporting-legs 1, on which are mounted end box-frames 2, braced in position by proper braces 3 and connected by a bar or plate 4. To the box-frame (see Fig. 1, at left hand) are secured oppositely-positioned standards 5 6, and at the opposite end of the box-frame are vertical standards 7 8, having their upper ends secured to horizontal side rails 9 10, between which the hopper is supported.

At front of the machine, with their upper ends secured to the side rails of the frame, are two depending posts 11 12, having their lower ends connected to a cross-piece 13 and to the ends of parallel pieces 14 15, which rest on the standards 5 6 and have their other ends fixed in the standards 7 8, substantially as seen in the drawings. Between the pieces 14 and 15 is arranged a floor or board 14', on which the fan-case is mounted and suitably secured, and to brace the frames against endwise vibration studding 16 17 are provided and positioned as seen. At each side of the frames, at upper rear end portions, are secured side plates 18 19, which support the front end of the screen-box and between which the hopper is mounted.

On the frame, in a proper bearing, is journaled a gear-wheel 20, which constitutes the driving-gear of the machine and to the journal of which is attached a crank-arm 21 to turn the wheel. On the frame is mounted a shaft 22, on which is a pinion 23, in mesh with the driving-gear 20, and at the other end of the shaft 22 is mounted a belt-pulley 24, whereon is a belt 25, arranged with its lower end on the fan-pulley 26.

27 designates the fan-casing, consisting of a circular fan-chamber and a blast-spout 28, leading into the screen-box, substantially as shown. Because of the substitution of a frame for the usual well-known casing in machines of this kind the fan-casing may be made much narrower than usual and yet furnish all the blast necessary to effect the objects of the machine. The same reason and construction also permits the other members of the machine to be reduced in size without affecting the capacity of the machine.

29 designates the hopper, made of the usual shape and opening at its lower end into the screen-box and delivering the material onto the front end of the upper screen, as indicated in Fig. 3 of the drawings. In the rear side of the hopper is slidably and adjustably disposed a feed-regulator 30, made with a central vertical slot 31, opening at the lower edge of the regulator, and adapted to cover and close the slot is a plate or board 32, slidably positioned between flanged keepers 33, as seen in Fig. 7 of the drawings. It will be seen by reference to this Fig. 7 that the central slide may be left as closing the slot and with its lower end in alinement with the lower edge of the main feed-regulator, or the main feed-regulator may be left positioned at its lower limit and the slide 32 raised to any desired height. Thus the flow of material from the hopper to the screen-box may be regulated as required or desired.

34 designates the screen-box, loosely and pivotally hung from the upper rails 9 10 by means of hangers 35, rigidly secured to the rails and having their lower ends pivotally engaging in strips 36, which in turn have their lower ends pivotally secured to the sides of the screen-box. At the rear end of the screen-box is a horizontal projection 37 in communication with a trough or spout 38, into which whatever overflow from the box or screen may deposit and drop into such receptacle as may be furnished. To impart the requisite vibrations to the screen-box, the following-described means are employed: At the front end of the forward box-frame is an extension 39, to which are pivotally secured the lower ends of link-bars 41 42, connected by means of a bar 43, so that the link-bars will rock or vibrate in unison. To the upper end of the link-bar 41 is pivotally connected a rod 44, rigidly connected at its rear end portion to the side of the screen-box, and to the upper end of the link-bar 42 is pivotally connected the bar 45, having the outer end loosely connected to the side of the screen-box, as indicated in Fig. 2 of the drawings. The link-bar 41 is formed with a horizontally-extending arm 46, made with a series of perforations 47, in any one of which the lower end of a pitman 48 may be detachably connected, as indicated in Fig. 1, the upper end of the pitman being connected to a wrist-pin 49, fixed in the pinion 23. It will be perceived that when the pinion is rotated the pitman is reciprocated and the arm 46 vibrated, oscillating the link-bars and imparting reciprocation to the bars 44 and 45 and communicating the proper vibrations to the screen-box. The screen-box is provided with an upwardly-inclined bottom or floor 50 and oppositely-arranged spouts 51 52, so that the cleaned grain and the screenings may be discharged at opposite points, as will be hereinafter stated.

53 designates the upper screen, the frame of which is made flaring from the forward end to the rear end, as seen in Fig. 4 of the drawings, so that it will conform to the natural spread of the blast. The forward portion of this screen is provided with transverse slats or bars 54, between which the grain drops, and the rear portion is provided with a wire-netting 55, through which the cleaner grain falls. This screen 53 is secured in the screen-box 34 at a downward incline, as shown, and opens into the trough 37, so that the light grain may be deposited into the trough and run therefrom. To the front wall of the hopper on the inside is hinged a plate or bar 56, the lower end of which rests on a stepped block or floor 57, secured on the screen 55, substantially as indicated in Fig. 3 of the drawings. This stepped block serves the purpose of keeping the outlet of the hopper in such condition as to permit the grain to escape in regular flow as the screen is reciprocated endwise.

58 designates the lower screen, made of an oblong rectangular frame having secured therein a wire-netting 59, the frame being disposed in the screen-box at an upward incline from front to rear, so that the cleaned grain will run down the screen and drop over the front end thereof into the trough or spout 52, while the screenings will fall through the screen onto the inclined bottom of the screen-box and run down and be discharged through the trough or spout 51. These screens being secured suitably in the screen-box, which is adapted to vibrate and oscillate as heretofore mentioned, will be shaken correspondingly with the screen-box, and thus keep the materials continually in agitation during the process of passing through the machine.

60 designates a screen cleaner and agitator, comprising a plurality of parallel bars 61, adapted to lie upon the upper face of the lower screen and having their outer ends secured in relative position by a cross-wire 62. The front ends of the parallel bars are turned upward, as at 63, and are secured in a cross-piece 64, in which are elongated journals 65, which are slidably projected through the sides of the screen-box. To the middle of the bar 64 is fixed the inner end of a pull-bar 66, extending through the side of the screen-box and having its projecting end hooked in one arm of a rocking elbow-lever 67, fulcrumed in a bracket 68, fastened to the side of the screen-box. To the other arm of the elbow-lever is pivotally and detachably connected a bar 69, the one end of which is fixedly secured to the cross piece or bar 14, as seen in Fig. 1 of the drawings. It will be readily seen that when the screen-box is vibrated the elbow-lever will reciprocate the cleaner or agitator across the face of the screen, and thus prevent all clogging of the material on the face of the lower screen.

In the fan-casing is suitably journaled the fan-shaft 70, whereon is fixedly mounted any suitable fan 71 to supply the blast.

The operation or action of the machine is apparent and easily discerned, the functions of the several members and parts having been stated in the course of the description; but it may be stated concerning the utilization of the machine that the several members having been assembled, as shown in the drawings, the hopper may be supplied with the material to be winnowed, as usual. Then by turning the crank to rotate the gear connections the fan will be rotated to create the requisite blast, which is directed up against the upper screen and blows the lighter material away from the surface of the screen, and the grain and refuse or seeds drop down on the lower screen, which being of closer mesh retains the grain, while the finer seeds pass through the meshes of the screen, and the grain falls over the end of the screen and is delivered into the discharge-spout. The smaller seeds pass through the mesh of the lower screen and traveling down the inclined bottom of the screen-box are discharged at the end into the discharge-spout.

By flaring the screen 53 from its front to rear end the screen is made to conform to the shape of the blast from the fan-nozzle 28, so that the blast will exert a concentrated action on the bed of grain resting on the slatted narrow end 54 of the screen and then as its area increases and its power decreases in proportionate extent will spread the grain equally over the surface of the reticulated portion 55 of the screen, thus making provision for a more thorough and efficient spreading out of the grain and separation therefrom of the chaff and refuse.

I propose to supply a grinding or emery wheel in association with the gearing of the separator, and to accomplish this I mount a standard $a$ on the rail 10 and on the upper end journal a proper shaft on which is fixedly mounted an emery-wheel $b$, a pulley $c$ being also fixed on the shaft. The pulley is positioned so that the belt 25 may be removed from the fan-pulley and arranged on the pulley $c$, and the operation of the gearings thus be used to rotate the grinding-wheel.

Having thus described my invention, what I claim is—

1. A grain-separator comprising an oscillatory and vibratory screen-box, a downwardly-inclined upper screen flaring from its front to rear end, a lower oblong rectangular screen inclined downward from rear to front, means to oscillate and vibrate the screen-box, a fan to discharge a blast of air under the narrow end of the upper screen, and means to operate the fan and oscillate the screen-box.

2. A grain-separator comprising an oscillating and vibrating screen-box, oppositely-extending discharge-spouts for the grain and the screenings, a trough at the rear end of the screen-box into which light grain may deposit, an upper downwardly-inclined screen in the feed-box made flaring from the front to rear, a hopper to feed the material into the front end of the upper screen, a lower oblong rectangular screen inclined downwardly from rear to front and discharging into the grain-trough, shaking-rods connected to the screen-box, a fan mounted on the machine to discharge a blast of air under the narrow end of the upper screen, and means to rotate the fan and reciprocate the shaking-rods.

3. The combination with the hopper and the screen-box, of an upper screen located in the screen-box and comprising a frame narrower at one end than the other and a screen secured in the frame, and a fan to direct a blast under the narrow end of said screen.

4. The combination with the hopper, the screen-box, and the upper screen therein, of a stepped floor on the front portion of the screen, and a plate hinged to the front wall of the hopper and disposed with its free lower end on the stepped floor.

5. The combination with the hopper, the screen-box, and the upper screen therein, of a stepped floor on the front portion of the screen, a plate hinged to the front wall of the hopper and disposed with its free end on the stepped floor, and a slidable feed-regulating plate secured in the rear wall of the hopper.

6. The combination with the lower screen, of a cleaner and agitator on the screen, comprising a plurality of parallel bars having their outer ends connected to a cross-bar and their front ends turned vertically, a cross-piece to which the turned-up ends of the bars are secured, and means to reciprocate the bars across the upper face of the screen.

7. The combination with a screen, of a cleaner and agitator comprising a plurality of parallel bars connected together at their outer ends and secured to a cross-piece at their inner ends, an elbow-lever, a rod connecting one arm of said lever with the said cross-bar, and means connected with the opposite end of the lever for transmitting motion thereto, whereby the cross-bar will be reciprocated endwise to reciprocate the bars across the upper face of the screen.

In testimony whereof I affix my signature in presence of two witnesses.

FRANK S. OSBORNE.

Witnesses:
 JOHN GASEY,
 W. R. HALLETT.